(No Model.)
W. LIESS.
APPARATUS FOR SETTLING AND MOLDING STARCH.
No. 275,394. Patented Apr. 10, 1883.
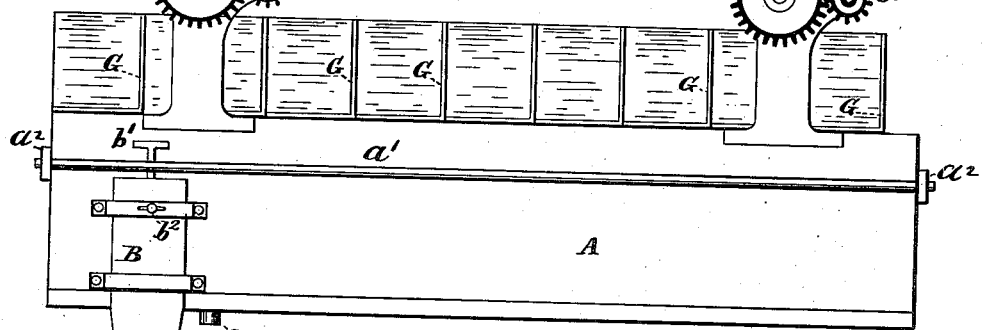
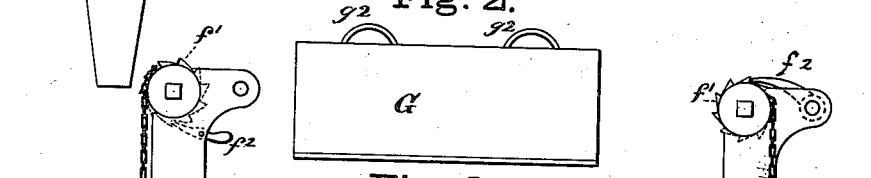
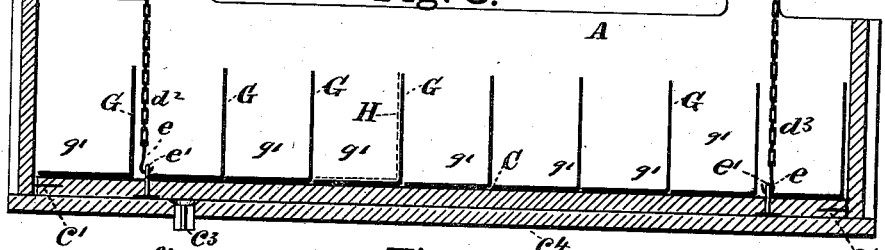
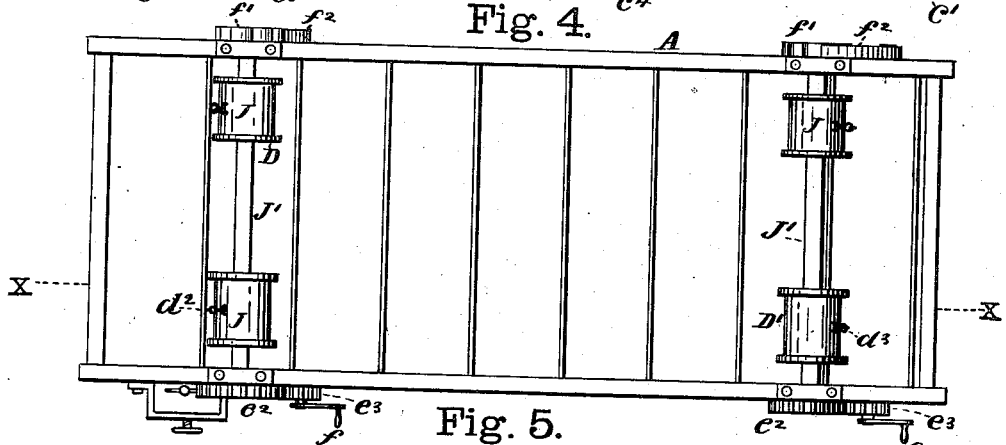
Witnesses.
J. M. Caldwell
H. Sangster
Inventor.
Wilhelm Liess
By James Sangster
Atty.

(No Model.)　　　　　　　　　　　　　　　　2 Sheets—Sheet 2.
W. LIESS.
APPARATUS FOR SETTLING AND MOLDING STARCH.
No. 275,394.　　　　　　　　Patented Apr. 10, 1883.
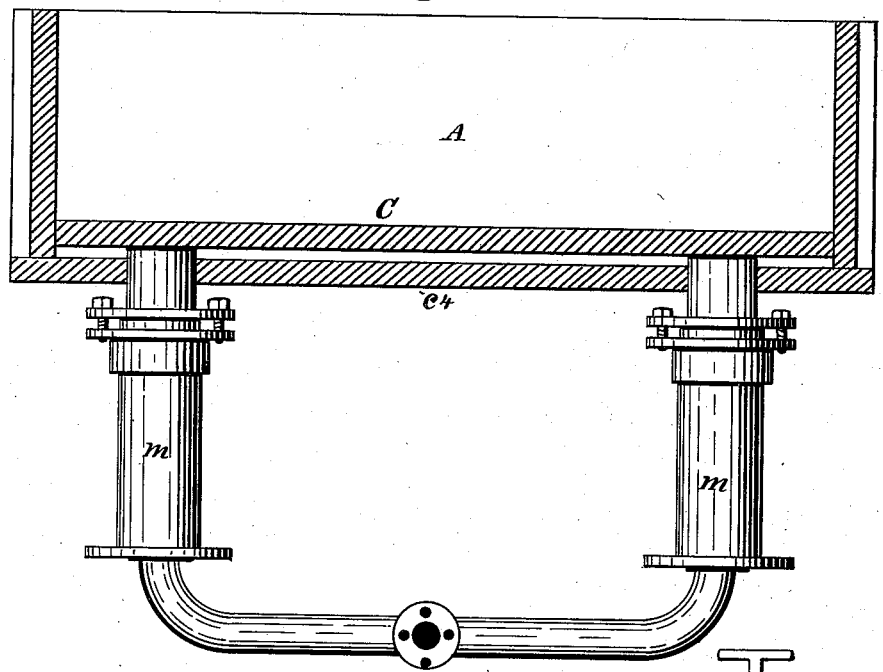
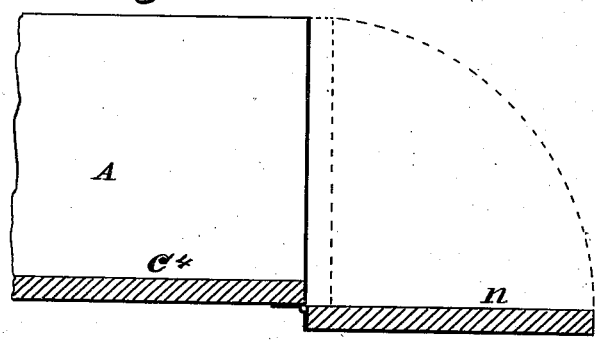
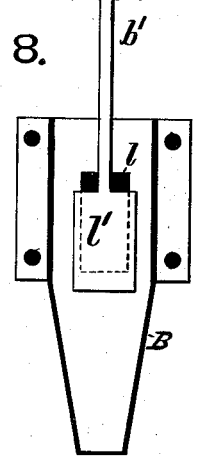
Witnesses.　　　　　　　　　　　　　　Inventor.

UNITED STATES PATENT OFFICE.

WILHELM LIESS, OF BUFFALO, NEW YORK.

APPARATUS FOR SETTLING AND MOLDING STARCH.

SPECIFICATION forming part of Letters Patent No. 275,394, dated April 10, 1883.

Application filed November 6, 1882. (No model.)

*To all whom it may concern:*

Be it known that I, WILHELM LIESS, a citizen of the United States, residing in Buffalo, in the county of Erie and State of New York, have invented certain new and useful Improvements in Apparatus for Settling and Molding Starch, of which the following is a specification.

The object of this invention is to provide an easy and convenient means for settling and molding starch, all of which will be fully and clearly hereinafter shown by reference to the drawings, in which—

Figure 1 is a side elevation; Fig. 2, a front view of one of the starch-block formers. Fig. 3 represents a vertical longitudinal section through the apparatus in line X X, Fig. 3, and Fig. 4 represents a plan or top view of the box and its operating mechanism. Fig. 5 represents a portion of a floor or bottom of a starch-box, showing a modification. Fig. 6 represents a vertical longitudinal section through the box, a vertically-movable floor or bottom, and a modified device for raising or lowering it. Fig. 7 is a section through a portion of a starch-box, showing also a modification; and Fig. 8 represents a detached sectional elevation of the valve.

A represents the box, made in the usual way, and held together by tie-rods $a'$ (shown in Fig. 1) and cross-bars $a^2$.

B represents a valve in the form of a slide-valve, having a handle, $b'$, to open or close it, and a hand-screw, $b^2$, for fastening it at any point desired or holding it open or closed. The valve B is provided with a long vertical opening, $l$, (see Fig. 8,) made sufficiently long to reach the level of the water in the box or tank, so that the valve $l'$ may be moved downward far enough to leave the opening just above the level of the starch when it has settled. If this opening should be below the level of the starch, the water, as it flowed out, would carry a portion of the starch with it. The object of this construction of the valve is to avoid this objection.

In Fig. 6 I have shown a modified apparatus consisting of the hydraulic pumps $m$, to which the usual mechanism is added for giving the necessary pressure for raising or lowering the floor C. In some cases the floor C may be dispensed with, and a door, $n$, may be hinged at one or both ends of the box, (see Fig. 7,) in which case the angle-plates G may be set directly on the bottom floor, $c^4$, so that when the starch has settled between them and the water is drawn off and the doors $n$ opened down the blocks of starch may be taken off and out, one at a time, as before mentioned, without the necessity of raising the floor up.

C represents the movable floor or bottom, adapted to fit closely, and provided on its edges with strips of rubber $c'$, or other elastic material, to render it as close fitting as practicable and still be capable of being moved up or down, it being moved down, as before mentioned, so that the angle-plates G may be put in to receive the starch as it settles between them, and when such movable floor is used it should be closely fitted, the object being to prevent, as much as possible, the leakage of starch through the sides to the bottom $c^4$ of the box.

$c^3$ represents an ordinary check-valve to be used when cleaning out the box A, or for any other purpose.

D D' represent two windlasses, which may be constructed in any well-known way for the purpose. To each windlass is secured a chain, $d^2$ $d^3$, for the purpose of raising the movable floor, to which it is connected by the hooks $e$ to the staples $e'$. The windlasses are fitted in boxes of any well-known construction, and are each provided with the gearing $e^2$ $e^3$ and handles $f$ to operate them. On the opposite side of the windlasses are ratchet-wheels $f'$ and pawls $f^2$ for holding the vertically-movable floor C to any point to which it may be adjusted. If desired, hydraulic pumps may be used instead of the gearing, and arranged in any well-known way to raise or lower the floor C.

The letters G represent a series of angle-plates, forming boxes $g'$ to receive the starch. They are each set loosely on the floor C, and are each provided with handles $g^2$. If desired, they may be covered with cloth, as shown by the dotted lines H in Fig. 3.

In operating with my invention the starch-liquor is put into the box A while the floor C is at its lowest position, and left over night or a sufficient time to settle, by which time the spaces $g'$ are filled with starch in a solid, compact condition. The water is now drawn off by opening the valve B, after which the floor C, together with the angle-plates G, is raised up by the windlasses or other equivalent means, so that the plates G, each holding a block of starch, as shown in Fig. 1, may be successively moved off. By this means the starch is taken out of the machine without the necessity of shoveling and in the form of blocks, which are easily handled and broken up, and a large amount of labor in the preparation of the starch is saved. When required there may be more or less than the number of windlasses shown, or a greater or less number of the angle-plates G, and in some cases the handles $g^2$ may be dispensed with, if desired. An equivalent for the angle-plates would be a series of removable flat plates set vertically in cross-grooves in the floor C, adapted to receive and hold them in a vertical position, so that when the starch settles and becomes solid between them they may be removed one at a time and the blocks of starch taken out, substantially as shown in Fig. 5. In some cases the rubber packing or strips $c'$ may be dispensed with and the floor fitted as closely as practical without them. If a small quantity of starch should get between the bottom of the floor C and the floor $c^4$, it can be easily removed and saved. The drums J on the windlasses, and to which the chains for raising the floor C are attached, are placed on square shafts J', or a round shaft with a feather on it, so that they can move sidewise as the chains are wound up on them.

I claim as my invention—

1. A starch-box provided with a vertically-movable floor and its vertically-adjustable mechanism, substantially as specified, in combination with a series of removable angle-plates, G, for the purposes described.

2. The within-described process of settling and forming starch into blocks, consisting in placing the starch-liquor into a box provided with a series of removable plates or angle-plates, and allowing the starch to settle between them until it becomes solid, and then removing the plates and blocks of starch therefrom, substantially as described.

3. A starch-box provided with a vertically-adjustable floor, C, provided with a rubber packing, $c'$, for rendering it tight when required, and a series of removable plates, G, in combination with windlasses adapted for raising the whole vertically, and holding the same at any point of its vertical adjustment by means of the ratchets $f$ and pawls $f^2$, substantially as described.

4. In a starch-box, the combination therewith of a valve, B, provided with a long vertical opening, $l$, a vertically-sliding valve, $l'$, having a handle, $b'$, for operating it and a hand-screw, $b^2$, for securing it at any point of its vertical adjustment, substantially as and for the purposes specified.

WILHELM LIESS.

Witnesses:
JAMES SANGSTER,
J. M. CALDWELL.